(12) United States Patent
Newman

(10) Patent No.: US 11,412,824 B2
(45) Date of Patent: Aug. 16, 2022

(54) PACKAGING FOR DISPOSABLE SOFT CONTACT LENSES HAVING PRE-FORMED MULTI-LAYER STRUCTURAL LAMINATE

(71) Applicant: MENICON SINGAPORE PTE LTD., Singapore (SG)

(72) Inventor: Stephen D. Newman, Singapore (SG)

(73) Assignee: MENICON SINGAPORE PTE LTD., Singapore (SG)

( * ) Notice: Subject to any disclaimer, the term of this patent is extended or adjusted under 35 U.S.C. 154(b) by 0 days.

(21) Appl. No.: 14/352,025

(22) PCT Filed: Oct. 18, 2012

(86) PCT No.: PCT/SG2012/000392
§ 371 (c)(1),
(2) Date: Apr. 15, 2014

(87) PCT Pub. No.: WO2013/058714
PCT Pub. Date: Apr. 25, 2013

(65) Prior Publication Data
US 2014/0246337 A1    Sep. 4, 2014

(30) Foreign Application Priority Data

Oct. 18, 2011  (SG) ............................. 201107635-3

(51) Int. Cl.
*A45C 11/00*  (2006.01)
*B32B 1/00*  (2006.01)
(Continued)

(52) U.S. Cl.
CPC .............. *A45C 11/005* (2013.01); *B32B 1/00* (2013.01); *B32B 3/28* (2013.01); *B32B 7/06* (2013.01);
(Continued)

(58) Field of Classification Search
CPC .......... A61J 1/00; A45C 11/04; A45C 11/005; B65D 1/34; B65D 25/14; B65D 25/36; B65D 53/08
(Continued)

(56) References Cited

U.S. PATENT DOCUMENTS 2,967,607 A    3/1960  Hollinger
4,392,569 A    7/1983  Shoup
(Continued)

FOREIGN PATENT DOCUMENTS

CN    1980582 A    6/2007
CN    101252853 A    8/2008
(Continued)

OTHER PUBLICATIONS

PCT International Search Report for PCT International Patent Application No. PCT/SG2012/000392, dated Jan. 10, 2013.
(Continued)

*Primary Examiner* — Andrew D Perreault
(74) *Attorney, Agent, or Firm* — Dorsey & Whitney LLP

(57) ABSTRACT

A contact lens package includes a multi-layer laminate substrate and a cover sheet. The multi-layer laminate substrate includes a first polymer layer, a first metal layer and at least one pre-formed lens receiving portion that is sized to hold at least a portion of a contact lens. The cover sheet is removably secured to the substrate and configured to seal a contact lens within the at least one lens receiving portion. The substrate has sufficient structural integrity to maintain a shape of the lens receiving portion.

29 Claims, 12 Drawing Sheets

(51) Int. Cl.

| | |
|---|---|
| *B32B 15/088* | (2006.01) |
| *B32B 15/20* | (2006.01) |
| *B32B 27/36* | (2006.01) |
| *B32B 15/085* | (2006.01) |
| *B32B 3/28* | (2006.01) |
| *B32B 15/09* | (2006.01) |
| *B32B 27/30* | (2006.01) |
| *B32B 7/06* | (2019.01) |
| *B32B 27/32* | (2006.01) |
| *B32B 27/34* | (2006.01) |
| *A61J 1/03* | (2006.01) |

(52) U.S. Cl.
CPC .......... *B32B 15/085* (2013.01); *B32B 15/088* (2013.01); *B32B 15/09* (2013.01); *B32B 15/20* (2013.01); *B32B 27/302* (2013.01); *B32B 27/32* (2013.01); *B32B 27/34* (2013.01); *B32B 27/365* (2013.01); *A45C 2011/006* (2013.01); *A61J 1/035* (2013.01); *B65D 2585/545* (2013.01)

(58) Field of Classification Search
USPC .......................................................... 206/5.1
See application file for complete search history.

(56) References Cited

U.S. PATENT DOCUMENTS

| | | | |
|---|---|---|---|
| 4,691,820 | A | 9/1987 | Martinez |
| 5,620,088 | A | 4/1997 | Martin et al. |
| 5,704,468 | A | 1/1998 | Lust et al. |
| 5,711,416 | A | 1/1998 | Bauman |
| 5,823,327 | A | 10/1998 | Wu et al. |
| 5,853,085 | A | 12/1998 | Luttrell |
| 6,029,808 | A | 2/2000 | Peck et al. |
| 6,113,927 | A | 9/2000 | Hatakeyama |
| 7,828,137 | B2 | 11/2010 | Newman |
| 2004/0004008 | A1* | 1/2004 | Peck .................... A45C 11/005 206/5.1 |
| 2006/0054514 | A1 | 3/2006 | Tokarski et al. |
| 2006/0260957 | A1 | 11/2006 | Hamilton |
| 2007/0056861 | A1* | 3/2007 | Duis .................... A45C 11/005 206/5.1 |
| 2008/0011619 | A1 | 1/2008 | Newman |
| 2008/0023345 | A1* | 1/2008 | Tokarski .............. A45C 11/005 206/5.1 |
| 2010/0270330 | A1* | 10/2010 | Caldwell ............ B65D 21/0202 222/107 |

FOREIGN PATENT DOCUMENTS

| | | |
|---|---|---|
| CN | 101516739 A | 8/2009 |
| EP | 0129388 A2 | 12/1984 |
| EP | 1092645 A1 | 4/2001 |
| EP | 1092645 B1 | 3/2004 |
| JP | H10193490 A | 7/1998 |
| JP | H11235790 A | 8/1999 |
| JP | 2008253746 A | 10/2008 |
| JP | 2009067403 A | 4/2009 |
| JP | 2009529467 A | 8/2009 |
| JP | 2009545001 A | 12/2009 |
| WO | 2006102384 A2 | 9/2006 |
| WO | 2007104371 A1 | 9/2007 |
| WO | 2008044145 A2 | 4/2008 |
| WO | 2013058713 A1 | 4/2013 |

OTHER PUBLICATIONS

Search Report issued by the Chinese State Intellectual Property Office for corresponding Chinese Patent Application No. 201280062564.7, dated Jul. 21, 2015.
Supplementary European Search Report for corresponding European Patent Application No. 12841842.3, completed Jul. 8, 2015.
English translation of Search Report for corresponding Taiwan Patent Application No. 101138448.
English translation of Decision on Rejection for Chinese Patent Application No. 201280062564.7, dated Jun. 5, 2018 (10 pages).
Fourth Office Action for Chinese Patent Application No. 201280062564.7, dated Oct. 23, 2017, with English translation (8 pages).
Second Examination Report for European Patent Application No. 12841842.3, dated May 16, 2018 (6 pages).
Second Office Action for Japanese Patent Application No. 2014-537031, dated Aug. 17, 2017, with English translation (6 pages).
First Office Action for Canadian Patent Application No. 2,852,882, dated Aug. 23, 2018 (4 pages).
Rule 71(3) EPC Intent to Grant for corresponding European Patent Application No. 12841842.3.

\* cited by examiner

PACKAGING FOR DISPOSABLE SOFT CONTACT LENSES HAVING PRE-FORMED MULTI-LAYER STRUCTURAL LAMINATE

TECHNICAL FIELD

The present systems and methods relate to contact lens packaging and more particularly, to contact lens packaging that includes pre-formed multi-layered laminates and contact lens packaging for a plurality of contact lens that includes alternative arrangements for the contact lenses.

BACKGROUND

Soft disposable contact lenses are commonly contained in disposable packages. As packaging adds to the overall cost of the lens, the packaging preferably is made as economically as possible without compromising the requisite packaging criteria. The traditional blister pack packaging (shown in FIGS. 1-3) for disposable lenses consists of a polypropylene receptacle for the lens (herein after referred to as a "boat"), topped by a multi-layer film (e.g., a cover sheet) typically consisting of polyethylene, aluminum, a bonding agent and polypropylene. The boat is usually formed using injection molded plastic having a high stiffness. The boat is filled with a suitable storage solution, such as saline, and receives a single lens in situ. The cover sheet is bonded to the boat and the blister pack packaging is then autoclaved using steam and pressure to terminal sterility. These blister packs are presented to the patient in boxes of individual packs (FIGS. 4-5) or as multiple blister strips having a single row of boats connected together in series.

One common marketing objective is to present the contact lens to a patient in an aesthetically pleasing package that both satisfies the statutory requirements for sterility and stability, and allows the patient to remove the lens safely and easily. The packaging is used only once and is discarded after the lens is removed. The disposability of the packaging impacts the costs of the lens/package combination. In order to reduce the overall price of the lens to the patient, the cost of the packaging should be kept to an absolute minimum while maintaining sterility and stability requirements. In addition, disposability of lens packaging necessitates conformity with ecological standards.

The lens must be kept hydrated while in the package. Typical boats have a significant thickness in order to limit liquid and vapor transmission through the boat in order to maximize the shelf life and prevent drying out of the lens. This significant boat thickness results in greater weight, higher material costs, and greater bulk for the contact lens packaging.

A variety of contact lens packages, particularly disposable contact lens packages including pre-formed blister packs, are taught in the prior art. As exemplified in the prior art, conventional wisdom in the contact lens industry has been to provide pre-formed stiff packaging which protects the lens from damage from applied load. Examples of typical prior art blister packs are shown in: U.S. Pat. Nos. 5,704,468; 4,392,569; 5,620,088; 5,620,088; 4,691,820; 5,823,327; 5,853,085; EP Publication No. 1092645 A1; EP Publication No. 1 092 645; and EP Publication No. 0 129 388.

There is a long felt need in the disposable contact lens industry to provide an economic, space-efficient, and functional, disposable contact lens package without compromise to durability, sterility and utility of the lens.

SUMMARY

One aspect of the present disclosure is directed to a contact lens package that includes a multi-layer laminate substrate and a cover sheet. The multi-layer laminate substrate includes a first polymer layer, a first metal layer and at least one pre-formed lens receiving portion that is sized to hold at least a portion of a contact lens. The cover sheet is removably secured to the substrate and configured to seal a contact lens within the at least one lens receiving portion. The substrate has sufficient structural integrity to maintain a shape of the lens receiving portion.

Another aspect of the present disclosure relates to a contact lens package that includes a substrate and a cover sheet. The substrate includes a plurality of pre-formed lens receiving portions each sized to receive at least a portion of a contact lens. The plurality of lens receiving portions are arranged in a plurality of rows. The cover sheet is releasably secured to the substrate and configured to seal closed the plurality of lens receiving portions. The rows of lens receiving portions may be arranged side-by-side or opposite each other.

A further aspect of the present disclosure is directed to a method for protecting a contact lens in a contact lens package. The method includes providing a laminate substrate and a laminate cover sheet, and pre-forming the substrate with at least one lens receiving portion having a shape. The at least one lens receiving portion has sufficient structural rigidity to maintain the shape. The method also includes disposing the contact lens in the at least one lens receiving portion, covering the at least one lens receiving portion with the cover sheet, and connecting the cover sheet to the substrate to seal the contact lens within the at least one lens receiving portion. The laminate substrate may include multiple layers each having a different material composition. In one example, the laminate substrate includes a first layer comprising a polymer material, and a second layer having a light-reflective material such as metal.

Another method in accordance with the present disclosure is directed to forming a contact lens package. The method includes providing a substrate and a cover sheet, forming a plurality of lens receiving portions in the substrate with the lens receiving portions arranged in multiple directions relative to each other, and connecting the cover sheet to the substrate to seal closed at least some of the plurality of lens receiving portions. The lens receiving portions may be arranged in a plurality of rows, and the row may be offset from each other.

BRIEF DESCRIPTION OF THE DRAWINGS

The accompanying drawings illustrate various embodiments of the present system and method and are a part of the specification. The illustrated embodiments are merely examples of the present systems and methods and do not limit the scope thereof.

In the drawings, identical reference numbers identify similar elements or acts.

DETAILED DESCRIPTION

Figure 1:
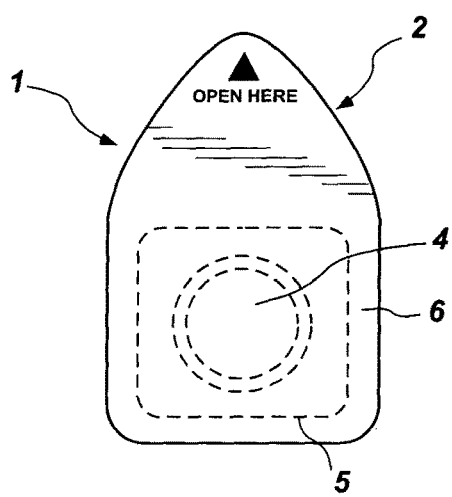
FIG. 1 is a top view of a typical prior art disposable blister contact lens package.

The present disclosure is directed to packages for contact lenses and methods for manufacturing and assembling the contact lens packaging. One aspect of the present disclosure relates to a package with a pre-formed laminate substrate. One layer of the laminate substrate is configured to provide sufficient structural rigidity to maintain a shape (e.g., a lens receiving portion) that is pre-formed in the substrate. In one example, the first layer includes a polymer material such as polypropylene. Another layer of the laminate substrate may include a second material that provides different properties from the first layer such as, for example, light-reflectivity, strength, and resistance to water/vapor permeability. The package also includes a cover sheet that is connected to the substrate and seals a contact lens within a lens receiving portion formed in the substrate. The cover sheet may also be a laminate having at least two layers. The first layer may comprise, for example, a polymer that assists in connecting the cover sheet to the substrate. Another layer of the cover sheet may include a material having different properties such as, for example, greater light-reflectivity, strength, or resistance to water/vapor permeability properties.

A further aspect of the present disclosure is directed to a single contact lens package that houses multiple contact lenses. The contact lens package may include a plurality of lens receiving portions (e.g., recesses, depressions or "boats") formed in the substrate. The lens receiving portions may be arranged in multiple directions such as multiple rows, wherein each row includes at least one contact lens receiving portion. The rows may be arranged opposite each other or side-by-side. Some contact lens packages may provide for separation of at least one lens receiving portion from the other lens receiving portions. Other arrangements may include a plurality of lens receiving portions that are inseparable from each other once the contact lens package is assembled.

Some contact lens packages may include layers of material for the cover sheet and substrate that are added during assembly of the contact lens package rather than being provided with the substrate and/or cover sheet as a laminate. In one example, at least one layer of light-reflective material or liquid/vapor impermeable material is added to the substrate or the cover sheet after sealing a contact lens within a lens receiving portion of the substrate.

The contact lens package may include a cap member that covers the lens receiving portion after positioning a contact lens within the lens receiving portion. The cap member may help compress the contact lens within the lens receiving portion to decrease a side profile (e.g., depth) of the contact lens from a sagittal depth to compressed depth. The cap member may be held in place with the cover sheet. The cap member and portions of the substrate (e.g., lens receiving portion) may include a plurality of perforations that provide a more advantageous interface with some types of contact lenses. Compressing the contact lens within the contact lens package may make it possible to provide the contact lens package with a reduced overall thickness, which may provide a number of advantages related to packaging, storing, and shipping the contact lens package.

The exemplary contact lens packages disclosed herein may be created in a single manufacturing line. The substrate and sheet may comprise materials capable of maintaining a sterile environment within the package where the lens is disposed. The sterile environment may be created by heating the first material of the substrate. Light-sensitive materials disposed within the package may also be protected from light to limit degradation of the light-sensitive materials. The substrate and cover sheet may comprise materials that permit printing of graphics that minimize negative effects on the light-reflecting attributes or the sterile environment of the contact lens package. In some arrangements, the contact lens package may be configured for use as an insertion aid. The materials of the contact lens package may promote improved sealing between the substrate and cover sheet layers. For example, the laminate materials used for at least one of the substrate and cover sheet may include layers of material in the area where a seal is formed between the substrate and cover sheet that provide improved seals (e.g., peelable seals, permanent seals, hermetic seals, heat seals, etc.).

As used in the present specification and in the appended claims, the term "sterile material" refers generally to any material which may come into physical and fluid contact with a contact lens. Although polypropylene is commonly used as a sterile material in contact lens packages, any other material that is capable of creating a sterile environment for contact lenses can be used in the present article and method as well. According to one exemplary embodiment, a sterile material may include any material accepted by the Food and Drug Administration (FDA) as suitable for the packaging of sterile medical devices.

In the following description, certain specific details are set forth in order to provide a more complete understanding of various embodiments of the present systems and methods. However, one skilled in the relevant art will recognize that the present exemplary systems and methods may be practiced without one or more of these specific details, or with other methods, components, materials, etc. In other instances, well-known structures associated with manufacturing and assembly of contact lens packaging have not been shown or described in detail to avoid unnecessarily obscuring descriptions of the present exemplary embodiments.

Unless the context requires otherwise, throughout the specification and the claims that follow, the word "comprise" and variations thereof, such as, "comprises" and "comprising" are to be construed in an open, inclusive sense, that is, as "including, but not limited to." Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment. Furthermore, the particular features, structures, or characteristics may be combined in any suitable manner in one or more embodiments.

Figure 2:
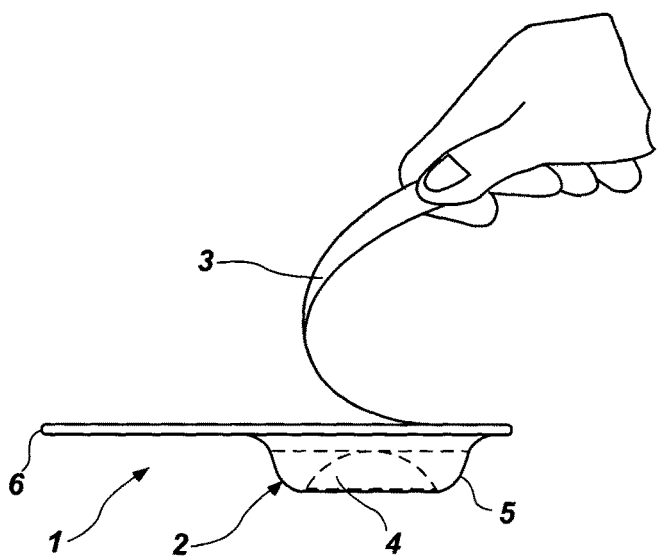
FIG. 2 is a side view of the package of FIG. 1 with the lid peeled away to release the contact lens therein.
Figure 3:
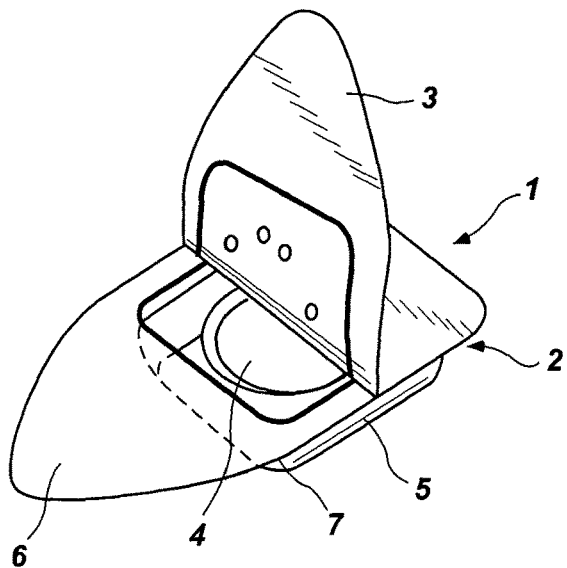
FIG. 3 is a perspective view of the partially opened package of FIG. 2.

Referring to FIGS. 1 and 2, there is shown a typical prior art disposable blister contact lens package (1) that is formed in two parts. The contact lens package (1) comprises a blister pack member (2) which is sealed by a membrane (3) forming a lid on the contact lens package (1) and which may be peeled away to release a contact lens (4) therein. In FIG. 3, the package of FIG. 2 is shown with the membrane (3) peeled away to expose the contact lens (4). Typically, the blister pack member (2) is a pre-formed blister pack that includes a profiled recess (5) which provides a recess in which a contact lens may be placed. The blister pack member (2) is typically injection molded and the package is completed with a sealing membrane (3) that mates with a flange (6) to create a sterile seal. The contact lens (4) is immersed in a solution (7) that keeps the contact lens hydrated until the contact lens is removed from the pack. The injection molded blister pack member (2) makes this an expensive package to manufacture, with the result that the contact lens will inevitably be more expensive for the consumer. Further, a thickness of the blister pack member (2) needed to maintain the shape and structural rigidity of the blister pack member (2) adds significant weight to the contact lens package (1).

Figure 4:
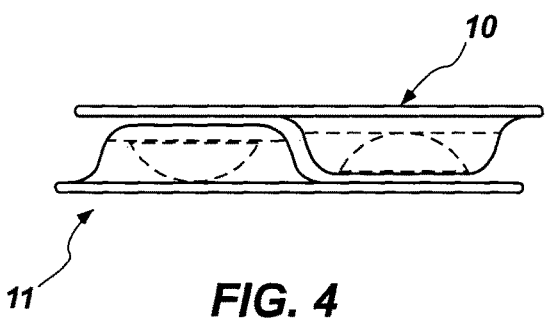
FIG. 4 is a side view showing a stacking arrangement for two of the contact lens packages of FIG. 1.
Figure 5:
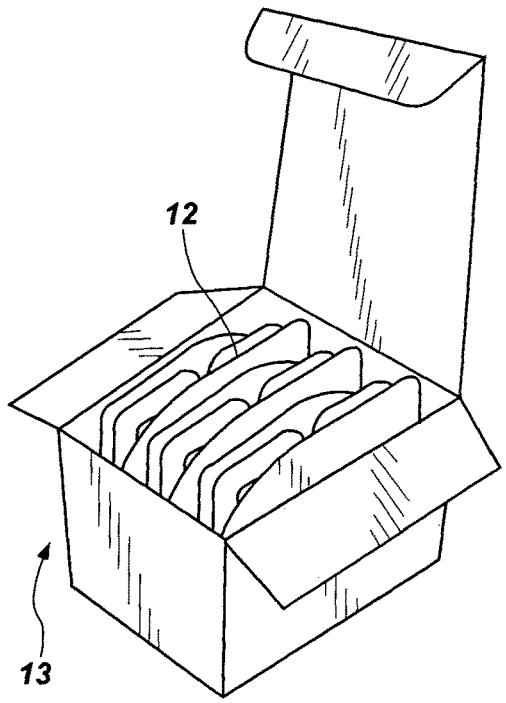
FIG. 5 is a perspective view showing a plurality of contact lens packages of FIG. 1 stacked as in FIG. 4 and contained in a carton.

FIG. 4 shows a stacking arrangement for two identical prior art contact lens packages (10), (11). It can be seen from FIG. 4 that although two packs conveniently inter-fit, they take up a thickness greater than the thickness (or depth) of two packs. Ideally, a lens package should take up as little space as possible considering the relatively small size of a contact lens. Economy of storage space is a critical issue where lenses are mass produced. The existing blister packs occupy a disproportionate amount of space relative to the size of the lens, leading to increased handling and storage costs. FIG. 5 shows a plurality of like blister packs (12) stacked as in FIG. 4 and retained in a carton (13). This bulky, inconvenient, and materials-intensive form of lens packaging exists as a result of conventional wisdom which suggests that lenses can only be stacked in rigid containers that isolate the lens from external loads.

Referring now to FIGS. 6-12, an example contact lens package (100) is shown and described. The contact lens package (100) may be configured to retain a single contact lens. The contact lens package (100) may include a substrate (102), a cover sheet (104) connected or sealed to the substrate (102), and a contact lens (106) retained between the substrate (102) and cover sheet (104). The contact lens package (100) may include a handle (108) at one end that is configured to provide easier handling of the contact lens package (100) when accessing the contact lens (106). The contact lens package (100) may also include at least one graphic (112) (see FIGS. 10-11) positioned on at least one of the substrate (102) and cover sheet (104).

Figure 6:
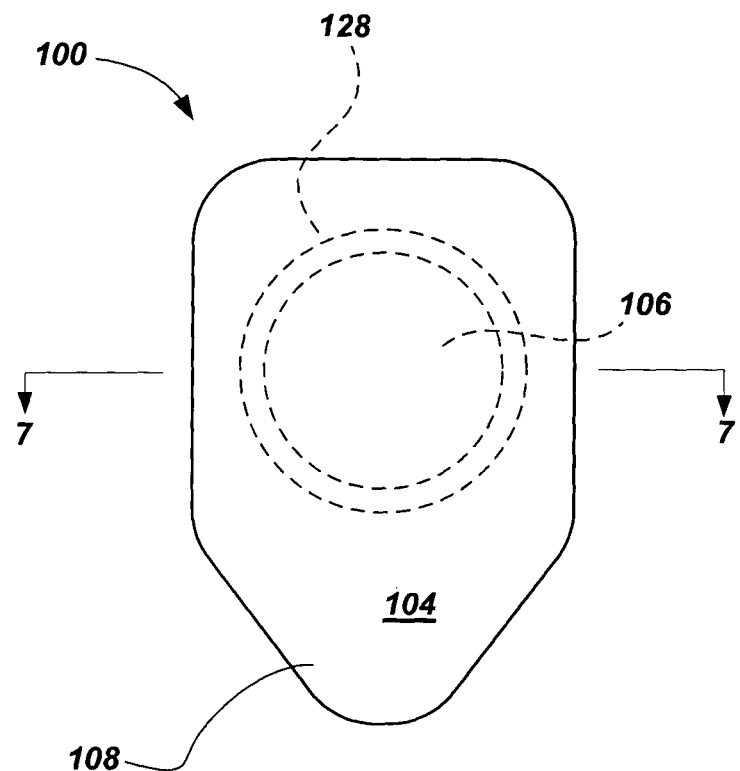
FIG. 6 is a top view of an example single contact lens package according to principles of the present disclosure.
Figure 7:
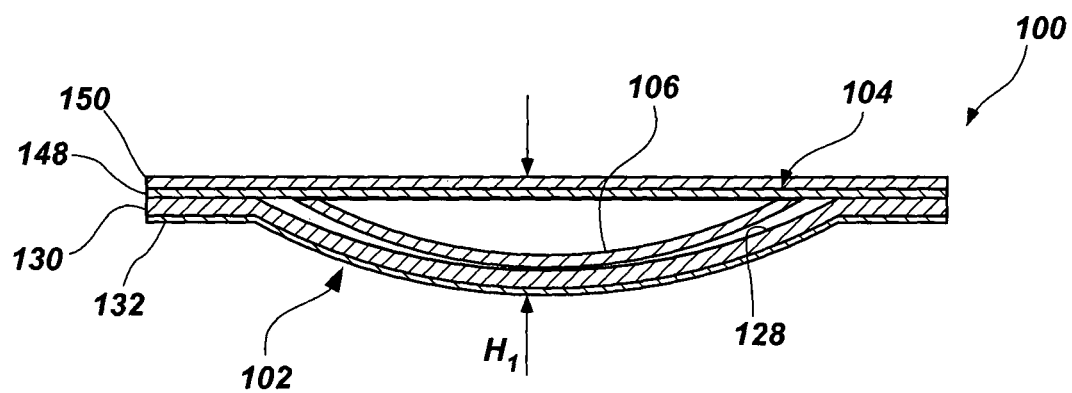
FIG. 7 is a side cross-section view of the contact lens package of FIG. 6 taken along cross section indicators 7-7.

The substrate (102) may include first and second ends (120), (122), a top surface (124), and a bottom surface (126) (see FIGS. 6-7). A lens receiving portion (128) may be defined in the substrate (102) and have a depth $H_2$. The substrate (102) may include first and second layers (130), (132). The first layer (130) may have a thickness $T_1$, and the second layer (132) may have a thickness $T_2$ (see FIG. 9). The thicknesses $T_1$, $T_2$ may together define a total thickness $T_3$ of the substrate (102).

The first layer (130) may include a material and have a construction that provides sufficient structural rigidity to maintain the shape and size of the lens receiving portion (128) under an applied load. The first layer (130) may include, for example, a polymer material. The type of polymer material and thickness $T_1$ may individually or together define at least in part a flexibility property and structural rigidity property of the first layer (130). The second layer (132) may include a different material such as, for example, a metal material. The second layer (132) may include a material having a light-reflective property. The second layer (132) may include a material that adds strength and rigidity to the substrate (102). The second layer (132) may include a material that improves resistance to liquid and vapor permeability so that moisture within the lens receiving portion (128) does not pass through the first and second layers (130), (132).

The lens receiving portion (128) may be pre-formed in the substrate (102). In some examples, the lens receiving portion (128) is pre-formed in the first layer (130), and the second layer (132) is connected to the first layer (130) after the pre-forming is completed. In other examples, the first and second layers (130), (132) are connected to each other prior to forming the lens receiving portion (128). The first and second layers (130), (132) may be combined as a laminate structure so that the substrate (102) is defined as a laminate member. The lens receiving portion (128) may be pre-formed in the laminate material of the substrate (102) prior to assembling the contact lens package (100) with the contact lens (106) sealed within the lens receiving portion (128) by connection of the cover sheet (104) to the substrate (102). Pre-forming the substrate (102) may include forming a shape, size, color or finish to some aspect of the substrate (102). In addition to pre-forming the lens receiving portion (128), other features may be pre-formed in the substrate (102) including, for example, perforations, surface texture, or colors.

The substrate (102) may include a sterile region in or around the lens receiving portion (128). This sterile environment may be created and maintained by using sterile materials for the substrate (102) that will not contaminate the contents of the contact lens package (100). Some example sterile materials include, for example, a homogeneous material such as natural or homopolymer polypropylene, although other materials are possible. The sterile material may provide structural flexibility and strength, resistance to impact forces, and other environmental conditions that might otherwise damage the contact lens (106). Other polymers possible for use as either or both of the first and second layers (130), (132) include, for example, polystyrene, polycarbonate, polyethylene, thermoplastics, plastics, and other polymers such as nylon, or a combination of these materials. Such materials may provide sterility and structural integrity to the extent needed to meet statutory and industry requirements.

At least one of the first and second layers (130), (132) may comprise a light-reflecting material such as, for example, platinum, gold, aluminum, or other metals. The light-reflecting properties of the substrate (102) may help protect the contents of the package from exposure to light (e.g., visible or ultraviolet light), which may otherwise degrade the light sensitive materials in the package. Some example light sensitive materials held in the contact lens package (100) may include, for example, dyes, vitamins, medications, coatings, etc.

Figure 8:
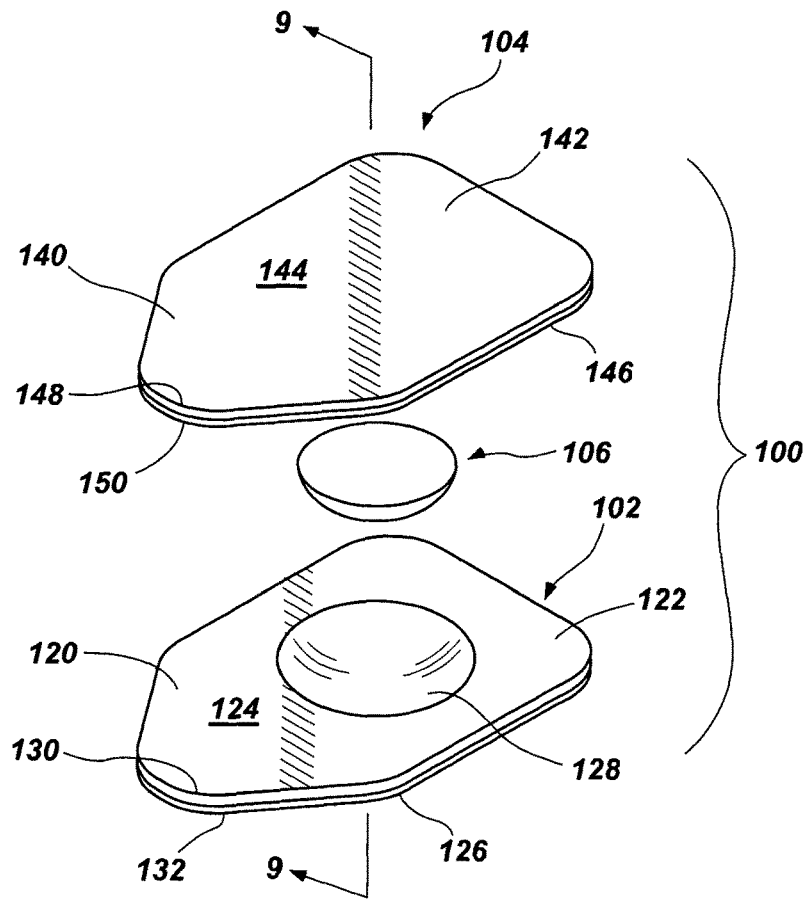
FIG. 8 is an exploded perspective view of the contact lens package of FIG. 6.
Figure 9:
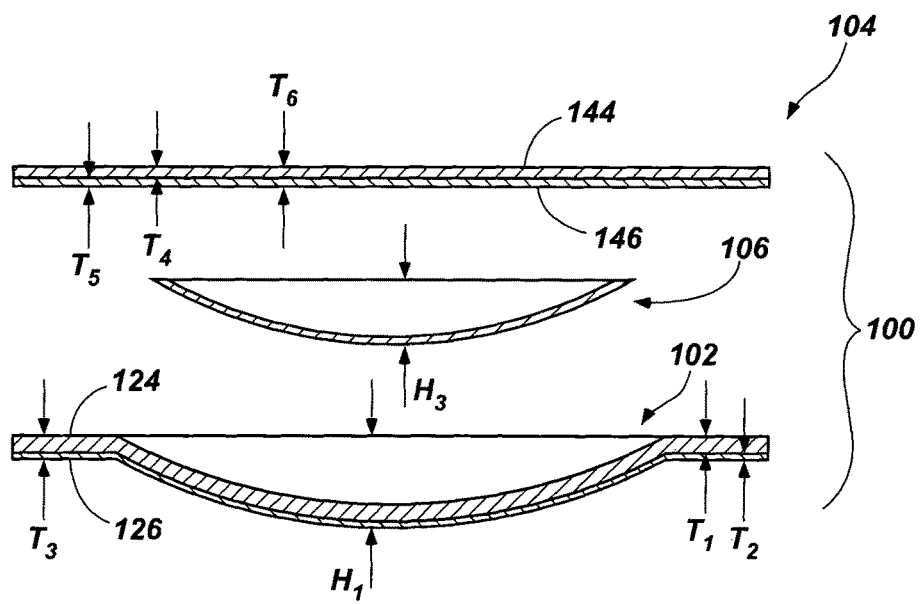
FIG. 9 is a side cross-section view of the contact lens package of FIG. 8.

Referring to FIGS. 8 and 9, the cover sheet (104) includes first and second ends (140), (142), a top surface (144), a bottom surface (146), and first and second layers (148), (150). The first layer (148) has a thickness $T_4$, and the second layer (150) has a thickness $T_5$. The cover sheet (104) may have a similar outer profile (i.e. length and width) as the substrate (102). Typically, a total thickness $T_6$ of the cover sheet (104) is less than a total thickness $T_3$ of the substrate (102).

The first layer (148) may comprise a first material and have different properties than the material and properties of the second layer (150). In one example, the first layer (148) comprises a polymer material. The first layer (148) may have a greater flexibility property as compared to the first layer (130) of the substrate (102). The materials of the first layer (148) of the cover sheet (104) and the first layer (130) of the substrate (102) may be similar to enhance a connection between the substrate (102) and cover sheet (104). In at least one example, the cover sheet (104) is heat bonded to the substrate (102). The materials of the first layer (130) and first layer (140) may bond or connect to each other upon application of heat or other connecting methods (e.g., ultrasonic, laser, infrared (IR), etc.). Furthermore, the use of common polymer materials in the first layers (130), (148) may reduce stresses between the substrate (102) and cover sheet (104) that might otherwise result from differences in thermal expansion coefficients.

The second layer (150) may comprise a material having different properties from the first layer (148). The materials of the second layer (150) may provide properties such as, for example, light-reflectivity, strength, and resistance to liquid/vapor permeation. The combination of the materials of the second layer (150) with the materials of the first layer (148) may provide a number of advantages as compared to a cover sheet (104) comprising only a metal material, or only a polymer materials. One advantage may be a cover sheet (104) that is thinner while still having the same or similar properties as a cover layer of a single material.

Typically, the cover sheet (104) has a greater flexibility as compared to the substrate (102). The cover sheet (104) may be configured to "peel back" from the substrate (102) to provide access to the contact lens (106). In some examples, the cover sheet (104) is attached to the substrate (102) using an adhesive. The adhesive may be strong enough to provide a hermetic seal between the substrate (102) and cover sheet (104), while being weak enough that the cover sheet (104) may be removed from the substrate (102) to provide access to the contact lens (106).

The materials of the first and second layers (148), (150) of the cover sheet (104) may include the same or similar materials as discussed above for the first and second layers (130), (132) of the substrate (102), respectively. The materials of the substrate (102) and cover sheet (104) may provide at least in part an insulative function that helps protect the contact lens (106) from severe temperatures. The severe temperatures may be present during the manufacturing and assembly process of the contact lens package (100). For example, heat applied during the manufacturing process to sterilize the contact lens package (100) and neutralize or kill bacteria or other substances that have been introduced during processing may be at least in part insulated from the contact lens (106) by the polymer materials of the first layers (130), (148). Local heating of portions of the substrate (102) and cover sheet (104) may permit the use of thinner first and second layers (130), (132) and (148), (150) than what otherwise may be required in order to insulate the contents held within the lens receiving portion (128).

At least one of the substrate (102) and cover sheet (104), alone or in combination, may be configured to have a structure (e.g., thickness), material composition, an arrangement of layers that helps reduce the loss or evaporation of fluids held within the lens receiving portion (128). Typically, if either the substrate (102) or cover sheet (104) is too thin, pores in the materials may permit fluids to evaporate or pass there through. In one example, fluids held within the lens receiving portion (128) may pass through the pores of the materials making up the substrate (102) and/or cover sheet (104) that results in dehydration and/or shelf life reduction of the contact lens (106). In one example, the total thickness $T_3$ of the substrate (102) is in the range of about 80 micron to about 4,500 micron, and more preferably in the range of about 150 micron to about 1,900 micron. In this example, the thickness of the cover sheet (104) is in the range of between about 25 to about 150 micron, preferably between 50 and 100 micron, and most preferably between 75 and 95 micron.

The thickness of the substrate (102) and cover sheet (104) may also influence the rigidity of those portions of the contact lens package (100). In one example, the thickness $T_1$ or the total thickness $T_3$ of the substrate (102) has a thickness ratio as compared to a thickness $T_4$ or a total thickness $T_6$, respectively, of the cover sheet (104) that is in the range of about 5:1 to 30:1, and more preferably in the range of about 10:1 to about 20:1.

In some embodiments, the internal depth $H_2$ of the lens receiving portion (128) is less than a sagittal depth $H_3$ of the contact lens (106) (see FIG. 9). The contact lens package (100) may be configured to compress the contact lens (106) within the lens receiving portion (128) to a height that is less than the sagittal height $H_3$. Providing compression of the contact lens (106) using the contact lens package (100) may reduce the total height $H_1$ (see FIG. 7) of the contact lens package (100). A reduction of the height $H_1$ may provide advantages in storing and shipping of the contact lens package (100) because not as much space is typically required for a reduced height contact lens package. Further, reducing the total height $H_1$ of the contact lens package (100) may also provide a reduced amount of material needed to create the contact lens package (100). A reduced amount of material typically results in a reduced weight for the contact lens package (100). In some examples, a thickness of the cover sheet (104) is increased to provide additional rigidity for the contact lens package (100).

Figure 10:
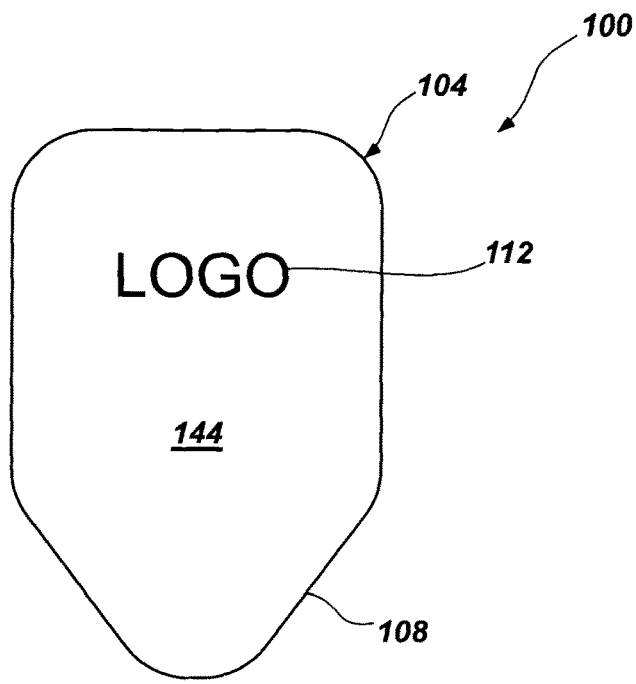
FIG. 10 is a top view of the contact lens package of FIG. 6 having a graphic.
Figure 11:
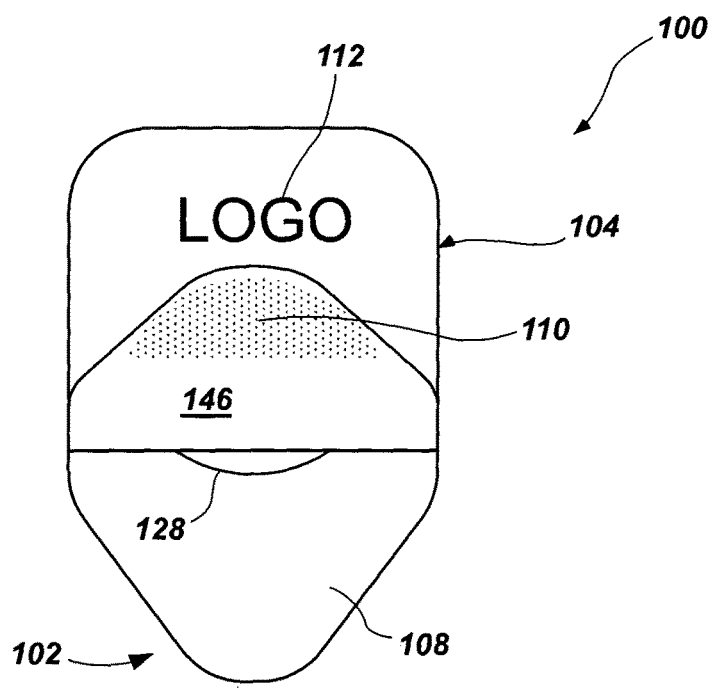
FIG. 11 is a top view of the contact lens package of FIG. 10 in a partially open position.
Figure 12:
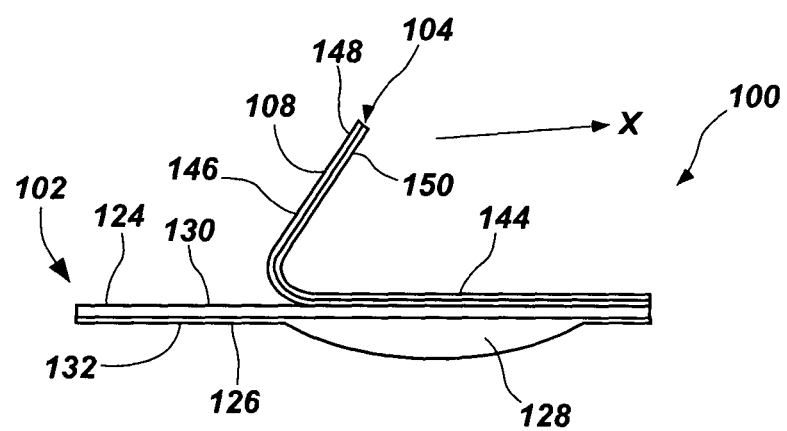
FIG. 12 is a side view of the contact lens package of FIG. 11.

Referring to FIGS. 10-12, the contact lens package (100) is shown being opened. FIG. 10 illustrates the contact lens package (100) in a closed state with a graphic (112) positioned on a top surface (144) of the cover sheet (104). FIG. 11 illustrates the cover sheet (104) being peeled back to release a connection between the cover sheet (104) and the substrate (102). The cover sheet (104) may include protrusions or another friction surface (110) along a bottom surface (146) that assists in grasping the cover sheet (104). The cover sheet (104) may be unsealed relative to the substrate (102) in the area of the friction surface (110) even in the unopened position shown in FIG. 10. FIG. 12 is a side view of the partially opened contact lens package (100) showing FIG. 11. Further pulling the cover sheet (104) in the direction X shown in FIG. 12 while maintaining the substrate (102) in a fixed position will further expose the lens receiving portion (128) so that a user can remove the contact lens (106).

According to the above description related to FIGS. 6-12, one aspect of the present disclosure relates to a contact lens package that includes a multi-layer laminate substrate having a first polymer layer, a first metal layer, at least one pre-formed lens receiving portion sized to hold at least a portion of a contact lens. A cover sheet may be removably secured to this substrate and configured to seal a contact lens within the at least one contact lens receiving portion. In other arrangements, the multi-layer laminate substrate may comprise first and second layers in at least one pre-formed lens receiving portion sized to hold at least one contact lens. The first layer may comprise a polymer material and the second layer may comprise a non-polymer material or any material having different properties than the material of the first layer. The second layer may comprise a light-reflective material such as a metal material. In some embodiments, the substrate comprises a single layer and at least one pre-formed lens receiving portion, and the cover sheet comprises a multi-layer laminate. A ratio of a thickness of the substrate to the thickness of the cover sheet may be in the range of about 2:1 to about 30:1. The substrate may have a lens receiving portion having a shape, and the substrate may have sufficient structural rigidity to maintain the shape of the lens receiving portion.

Another example according to the above disclosure relates to a contact lens package that includes a laminate substrate and a laminate cover sheet. The substrate may be pre-formed with at least one lens receiving portion and have a structural rigidity that maintains the shape and size of the at least one lens receiving portion upon application of a load. A contact lens may be disposed in the lens receiving portion and covered with the cover sheet. The cover sheet is connected (e.g., using a peelable seal connection) to seal the contact lens within the at least one lens receiving portion. The substrate may include a plurality of lens receiving portions.

Figure 13:
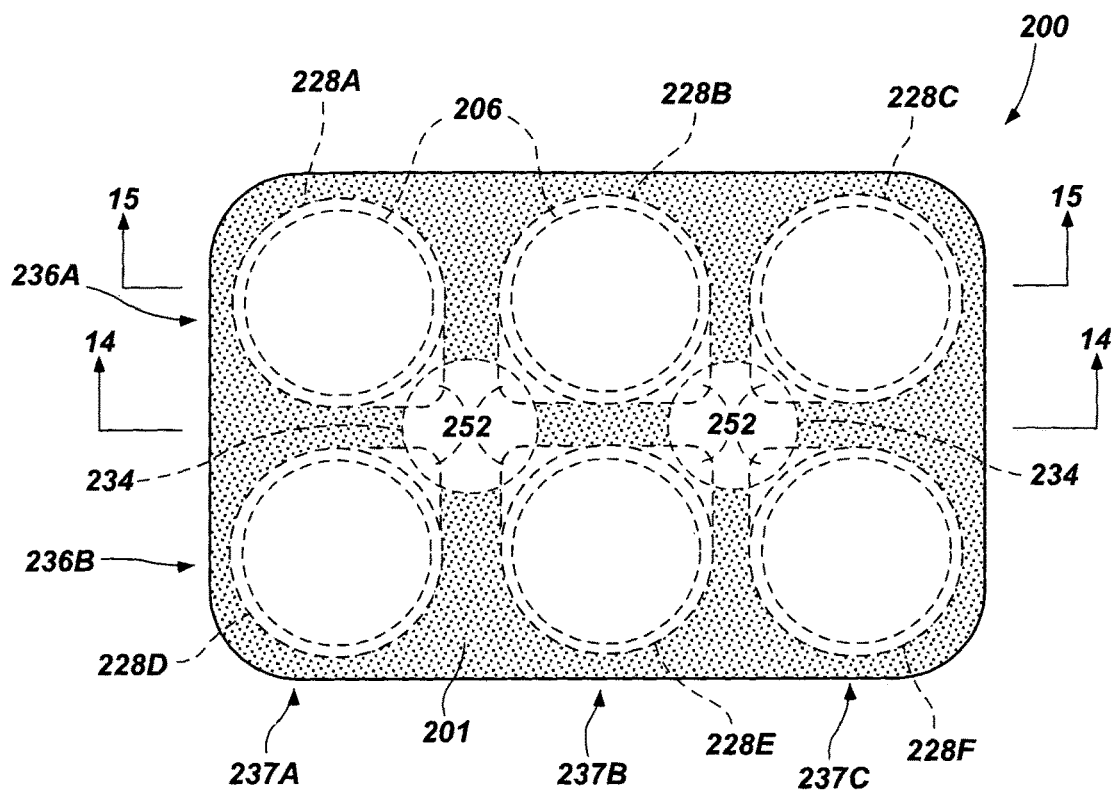
FIG. 13 is a top view of another example contact lens package according to principles of the present disclosure.

Referring now to FIGS. 13-16, another example contact lens package (200) is shown and described. The contact lens package (200) includes a substrate (202), a cover sheet (204), and may be configured to retain a contact lens (206). The substrate (202) may define a plurality of lens receiving portions (228A-F) each sized to receive a separate contact lens (206). The cover sheet (204) may be configured to cover each of the lens receiving portions (228A-F). A connection between the cover sheet (204) and the substrate (202) may seal the contact lenses (206) within the lens receiving portions (228A-F). FIG. 13 illustrates a seal area (201) extending around each of the lens receiving portions (228A-F).

A plurality of pull tabs (252) may be defined between the seal area (201) and the lens receiving portions (228). The pull tabs (252) may be defined as a portion of the cover sheet (204) that is not sealed to the substrate (202) and that is not covering or overlapping the lens receiving portions (228A-F). The pull tabs (252) may be grasped by an operator to help remove a portion of the cover sheet (204) from the substrate (202) to gain access to the contact lenses (206).

The substrate (202) may include first and second ends (220), (222), the lens receiving portions (228A-F), and first and second layers (230), (232). The first layer (230) may have a thickness $T_1$, and the second layer (232) may have a thickness $T_2$ (see FIG. 16). The substrate (202) may have a total thickness $T_3$ (see FIG. 14).

The substrate (202) may also include a plurality of tab apertures (234). The tab apertures (234) may be interposed or spaced between the plurality of lens receiving portions (228A-F). In one embodiment, the tab apertures (234) extend through the first layer (230). In other examples, the tab apertures (234) extend through both of the first and second layers (230), (232). The tab apertures (234) may extend only through the first layer (230) in arrangements in which the second layer (232) is connected to the first layer (230) after formation of the lens receiving portions (228A-F). In embodiments in which the substrate (102) is provided as a multi-layer laminate, the tab apertures (234) may be formed through the entire thickness $T_3$ of the laminate before or after formation of the lens receiving portion (228A-F).

The substrate (202) may also include an arrangement of the lens receiving portion (228A-F) in a plurality of rows and columns. FIG. 13 illustrates the lens receiving portions (228A-F) in first and second rows (236A-B) and first, second and third columns (237A-C). The first and second rows (236A-B) may be opposed to each other or spaced side-by-side next to each other (e.g., in a lateral direction). The lens receiving portions (28A-C) may be aligned with the lens receiving portions (28D-F) to create the first, second and third columns (237A-C). In other arrangements, the lens receiving portions of the first row (236A) may be offset from the lens receiving portions of the second row (236B). The first, second and third columns (237A-C) may be defined as being arranged opposite each other, arranged side-by-side adjacent to each other, or be arranged laterally or longitudinally spaced apart from each other. Each of the first and second rows (236A-B) and first, second and third columns (237A-C) may include at least one lens receiving portion (228A-F). In some arrangements, multiple lens receiving portions may be included in each of the rows and columns, with no limit to the number of lens receiving portions for any given row or column.

The substrate (202) of FIGS. 13-16 includes six lens receiving portions (228A-F) arranged into two rows and three columns. Other arrangements are possible including, for example, a substrate (102) having ten lens receiving portions arranged in two rows and five columns. Each of the columns may contain a left and a right eye contact lens associated with a single day or week disposable pair of contact lenses. In other arrangements, three or more rows with at least two columns of lens receiving portions may be positioned on a substrate. In still further arrangements, a pair of rows and a single column may be packaged together as right and left contact lenses as shown in, for example, FIG. 24 (described in further detail below).

The first and second layers (130), (232) may comprise materials, shapes, sizes, and configurations that are the same or similar to first and second layers (130), (132) described above. Further, the first and second layers (248), (250) may have the same or similar materials, shapes, sizes and configurations as the first and second layers (148), (150) described in detail above.

Figure 14:
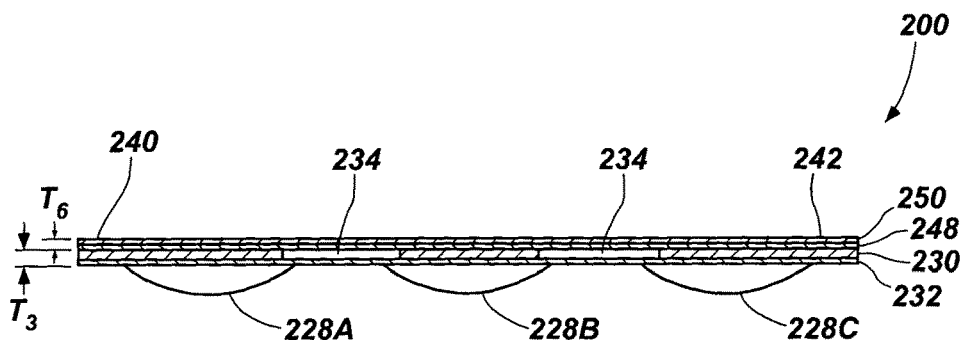
FIG. 14 is a side cross-section view of the contact lens package of FIG. 13 taken along cross-section indicators 14-14.
Figure 15:
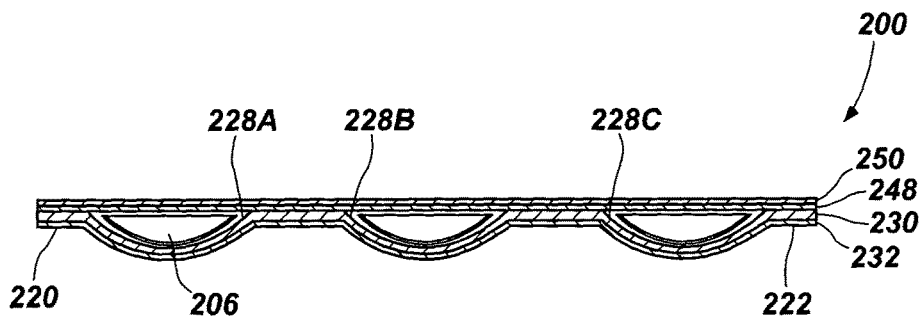
FIG. 15 is a side cross-section view of the contact lens package of FIG. 13 taken along cross-section indicators 15-15.
Figure 16:
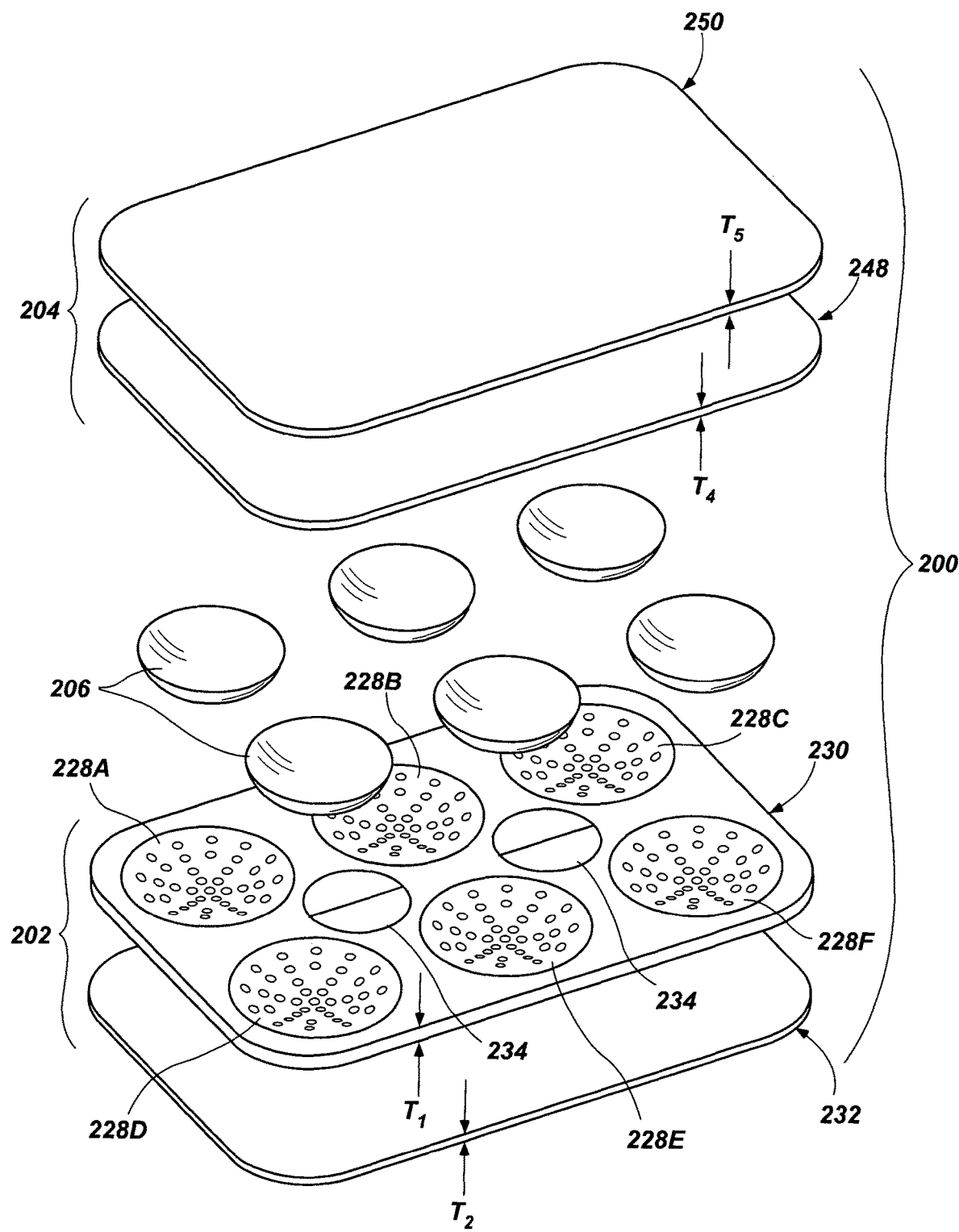
FIG. 16 is an exploded perspective view of the contact lens package of FIG. 13.
Figure 17:
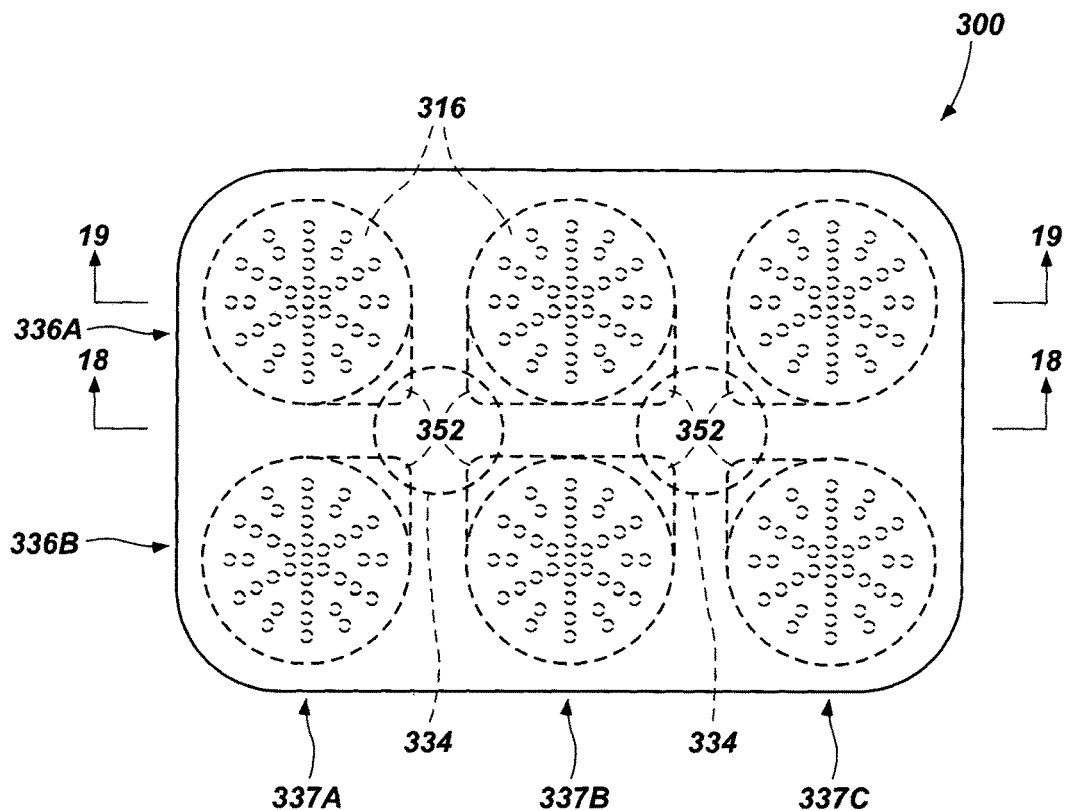
FIG. 17 is a top view of another example contact lens package according to principles of the present disclosure.
Figure 18:
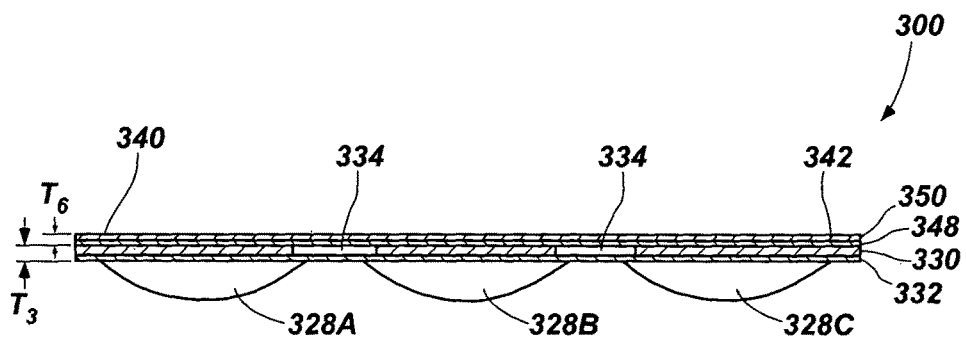
FIG. 18 is a side cross-section view of the contact lens package of FIG. 17 taken along cross-section indicators 18-18.

The tab apertures (234) shown in FIGS. 13, 14 and 16 may provide a portion of the cover sheet (204) that is not sealed to the substrate (202). The user may press upwardly through the bottom side of the substrate (202) and through the tab apertures (234) to contact a bottom surface of the cover sheet (204). Applying pressure to that portion of the cover sheet (204) overlapping the tab apertures (234) may result in creating an opening through the cover sheet (204). Pull tabs (252) in the cover sheet (204) (i.e., unsealed portions of the cover sheet (204) arranged adjacent to the lens receiving portions (228A-F)) may then be exposed for grasping by the user to help peel back a portion of the cover sheet (204) that is covering any one of the lens receiving portions (228A-F). Multiple pull tabs (252) may be positioned around a circumference of any one of the lens receiving portions (228A-F). In other arrangements, the pull tabs (252) may be positioned around a periphery of the contact lens package (200) (e.g., along the first or second end (220), (222)) so that the user may pull back the cover sheet (204) to expose a limited number of the lens receiving portions (228A-F) (e.g., one of the columns (237A-C)).

The contact lens package (200) may have similar height and thickness features as described above with reference to the contact lens package (100). Typically, the contact lens package (200) has an overall height $H_1$ that is relatively small. In some arrangements, an internal depth $H_2$ within the lens receiving portion (128) is smaller than a sagittal height $H_3$ (e.g., see FIG. 9) of the contact lens. In other arrangements, the depth $H_2$ of the lens receiving portions (228A-F) are greater than the sagittal height $H_3$, and the lens receiving portions (228A-F) may have different heights $H_2$ in different rows or columns.

A total thickness $T_3$ of the substrate (202) may be greater than a total thickness $T_6$ of the cover sheet (204) (see FIG. 14). In some arrangements the thickness $T_3$ is at least in order of magnitude greater than the thickness $T_6$. In other arrangements, a ratio of the thickness $T_3$ to the thickness $T_6$ is in the range of about 2:1 to about 30:1, and preferably about 5:1 to about 20:1. In one example, the thickness $T_3$ is in the range of about 80 micron to about 4,500 micron, and more preferably in the range of about 150 micron to about 1,900 micron. In this example, the thickness of the cover sheet (104) is in the range of between about 25 to about 150 micron, preferably between 50 and 100 micron, and most preferably between 75 and 95 micron.

Referring now to FIGS. 17-22, another example contact lens package (300) is shown including a substrate (302), a cover sheet (304), and the substrate (302) may be configured to receive a plurality of cap members (316). At least some of the lens receiving portions of the substrate and the cap members may have at least one aperture formed therein that provides an improved interface with a particular type of contact lens (306) retained therein. One example contact lens that may benefit from the construction and related contact lens interface provided by the substrate (302) and cap members (316) is a Silicon Hydrogel (SiHy) contact lens. The contact lens package (300) may be referred to as a SiHy compatible pack. SiHy lenses typically exhibit different characteristics from traditional Polymacon (HEMA) contact lenses.

Figure 19:
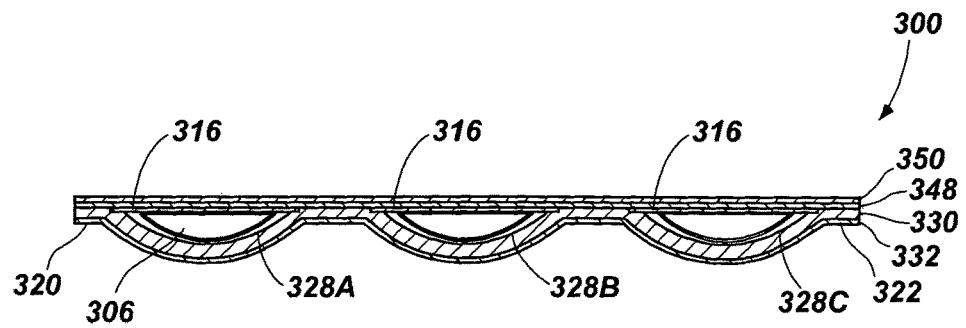
FIG. 19 is a side cross-section view of the contact lens package of FIG. 17 taken along cross-section indicators 19-19.
Figure 21:
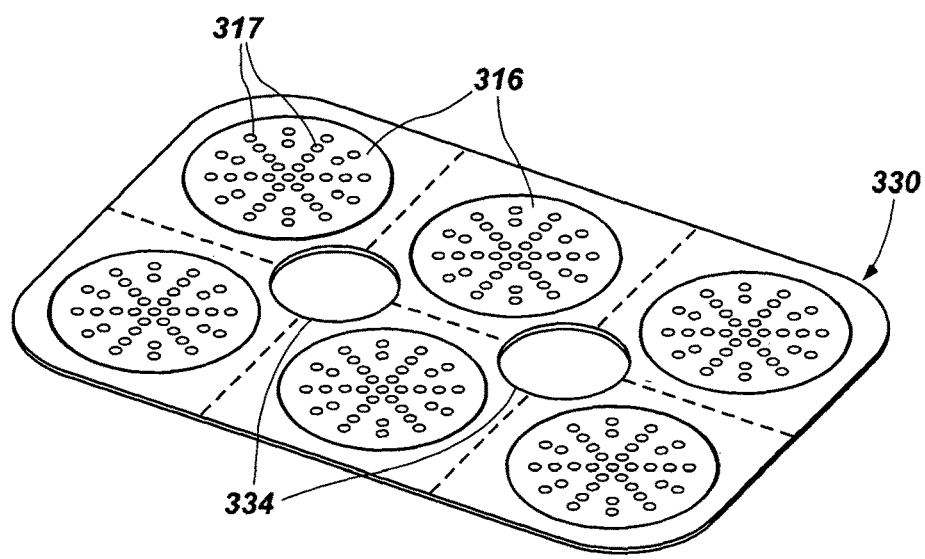
FIG. 21 is a perspective view of the substrate of FIG. 20 having a plurality of cap members positioned thereon.
Figure 22:
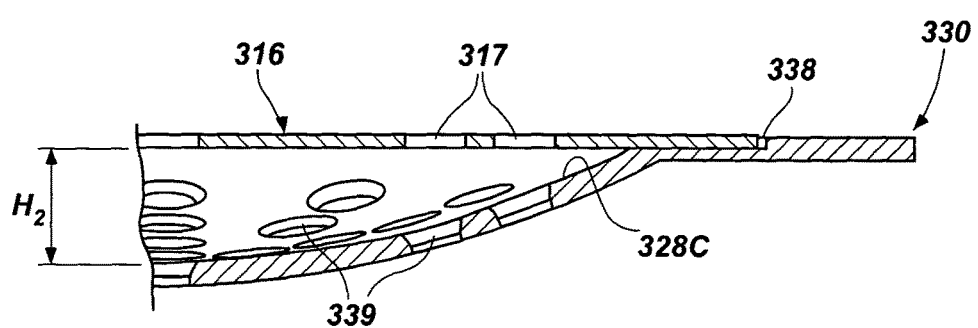
FIG. 22 is a partial cross-section view of the substrate and a cap shown in FIG. 21.

The substrate (302) may include first and second ends (320), (322), a plurality of lens receiving portions (328A-F), and first and second layers (330), (332). The first and second layers (330), (332) may have thicknesses $T_1$, $T_2$, respectively, and together define a total thickness $T_3$. The lens receiving portions (328A-F) may include a plurality of apertures (339) (see FIGS. 20 and 22). A cap recess (338) may extend around at least a portion of each of the lens receiving portions (328A-F). A plurality of cap members (316) may be positioned within the cap recesses (338) as shown in FIGS. 19, 21 and 22. The cap members (316) may include a plurality of cap apertures (317). The apertures (339), (317) may also provide an improved contact lens interface that may, for example, reduce friction and improve fluid flow.

The substrate (302) may also include a plurality of tab apertures (334) that provide the same or similar function as the tab apertures (234) described above with reference to contact lens package (200). The lens receiving portions (328A-F) may be arranged in first and second rows (336A-B) and first, second and third columns (337A-C). The arrangement of lens receiving portions (328A-F) in various rows and columns may have the same or similar configurations as those rows and columns described above with reference to the contact lens package (200).

Figure 20:
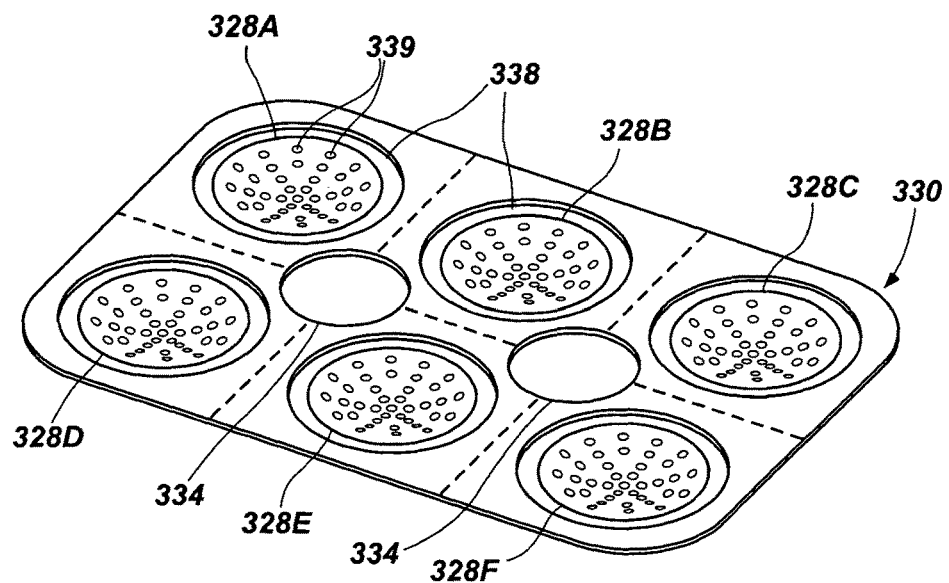
FIG. 20 is a perspective view of a substrate of the contact lens package of FIG. 17.

During a manufacturing and assembly process for the contact lens package (300), contact lenses may be positioned within the lens receiving portions (328A-F) shown in FIG. 20. Thereafter, the cap members (316) may be positioned overlapping and covering the contact lenses (306). In some arrangements, where cap recesses (338) are provided in the substrate (302), the cap members (316) may extend into and may be positioned within the cap recesses (338). The cap members (316) may be arranged substantially flush mounted with a top surface of the substrate (302) as shown in FIG. 22. In a further step, a cover sheet (304) may be releasably sealed to a top surface of the substrate (302) and covering the cap members (316). The cover sheet (304) may be used at least in part to maintain the cap members (316) overlapping the lens receiving portions (328A-F). The cover sheet (304) may also provide a compression force to press the cap members (316) toward the substrate (302). In some arrangements, where the lens receiving portion depth $H_2$ is less than a sagittal height of the contact lenses (306), the cap members (316) and the force applied by the cover sheet (304) may compress the contact lenses (306) to a reduced height.

The second layer (332) of the substrate (302) may be connected to a bottom side of the first layer (330) prior to or after the above-described steps of assembly. In one example, the second layer (332) is connected to the first layer (330) after the cover sheet (304) has been releasably sealed to a top surface of the first layer (330). In other arrangements, the first and second layers (330), (332) are provided as a multi-layer laminate that is pre-formed with a plurality of lens receiving portions (328A-F). In still further arrangements, the second layer (332) is a separate sheet that is connected to the first layer (330) in a separate assembly step prior to or after formation of the lens receiving portions (328A-F) in the first layer (330).

The cover sheet (304) may include first and second ends (340), (342) and generally have an outer profile that matches substantially with an outer profile of the substrate (302). The cover sheet (304) may include first and second layers (348), (350) that have thicknesses $T_4$, $T_5$, respectively, that together define a total thickness $T_6$. In some arrangements, the first and second layers (348), (350) are provided as a multi-layer laminate. In other arrangements, the first and second layers (348), (350) are separate layers that are connected as part of the manufacturing and assembly of the contact lens package (300). The first layers (330), (348) and second layers (332), (350) may have the same or similar materials, shapes, sizes and configurations as described above with reference to the first layers (130), (148) and second layers (132), (150) shown in FIGS. 13-16.

The number of lens receiving portions (328A-F) and their configuration in rows and columns may be the same or similar to those options described above with reference to contact lens package (200).

Figure 23:
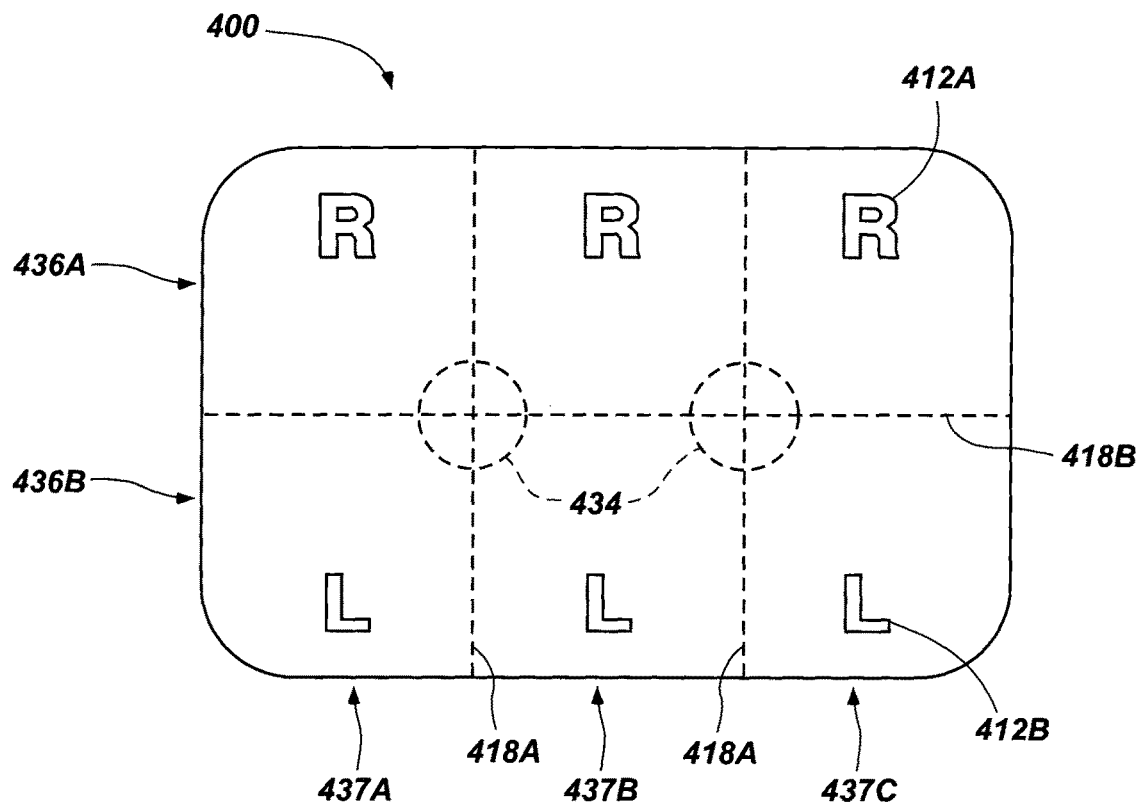
FIG. 23 is a top view of another example contact lens package according to principles of the present disclosure.

Referring now to FIG. 23, another example contact lens package (400) is shown. The contact lens package (400) includes first and second rows (436A-B) and first, second, and third columns (437A-C) of portions that retain a contact lens. Each of these portions may include a graphic (412A) or (412B) such as, for example, a graphic indicating right or left eye contact lenses. In one example, the row (436A) contains right eye contact lenses, and the second row (436B) contains left eye contact lenses. Each of the columns (437A-C) may include a pair of contact lenses such as a pair of single day use disposable contact lenses.

The contact lens package (400) may include a plurality of perforated lines (418A-B) extending in different directions. The perforated lines (418A-B) may provide easier disconnection of portions of the contact lens package (400). In some arrangements, the perforated lines (418A-B) are at least partially covered during manufacturing of the contact lens package (400). For example, the perforated lines (418A-B) may be included in only the substrate portion of the contact lens package (and a cover sheet portion of the contact lens package does not include perforated lines) so that once assembled the contact lens package (400) cannot be separated into different portions that each include a contact lens.

The contact lens package (400) may include the plurality of tab apertures (434) that assist in defining pull tabs in the contact lens package (400) that improve ease of accessing the contact lens sealed within the contact lens package.

Figure 24:
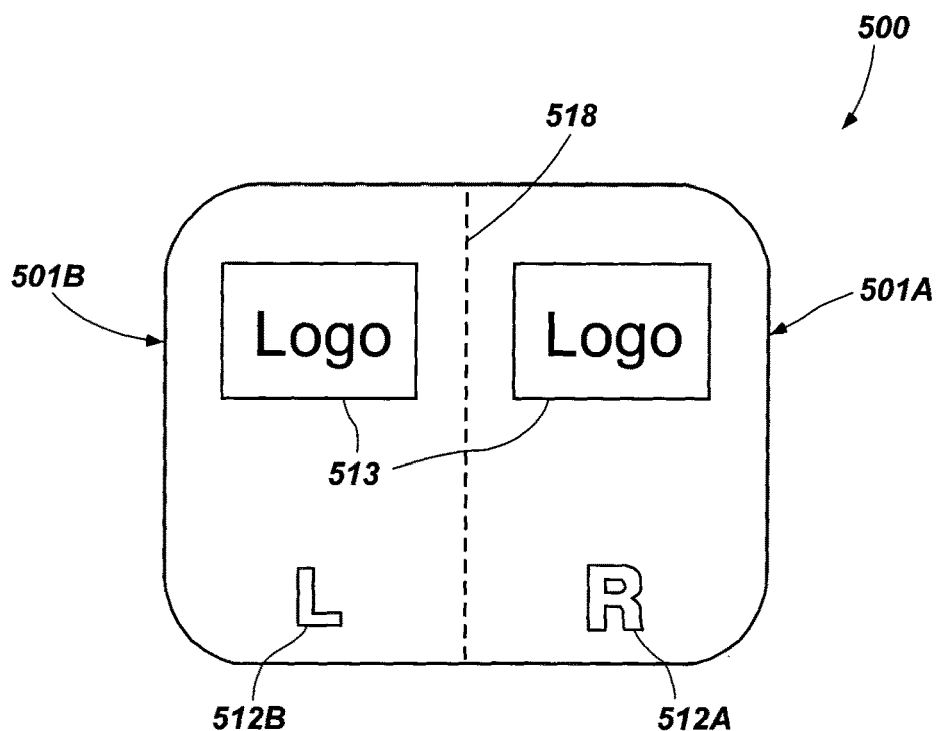
FIG. 24 is a top view of another example contact lens package according to principles of the present disclosure.

Referring to FIG. 24, another contact lens package (500) is shown including a pair of contact lens portions (501A-B). Each of the contact lens portions (501A-B) includes graphics (513) and one of the graphics (512A-B) indicating, for example, a right or left eye contact lens. A perforated line (518) may extend between the contact lens portions (501A-B) to improve ease of separating the two portions (501A-B). In some examples, the perforated line (518) may be included in only a portion of the contact lens package such as, for example, a substrate portion. Each of the contact lens portions (501A-B) may include the same or similar features to the contact lens package (100) described above with reference to FIG. 6-12.

Figure 25:
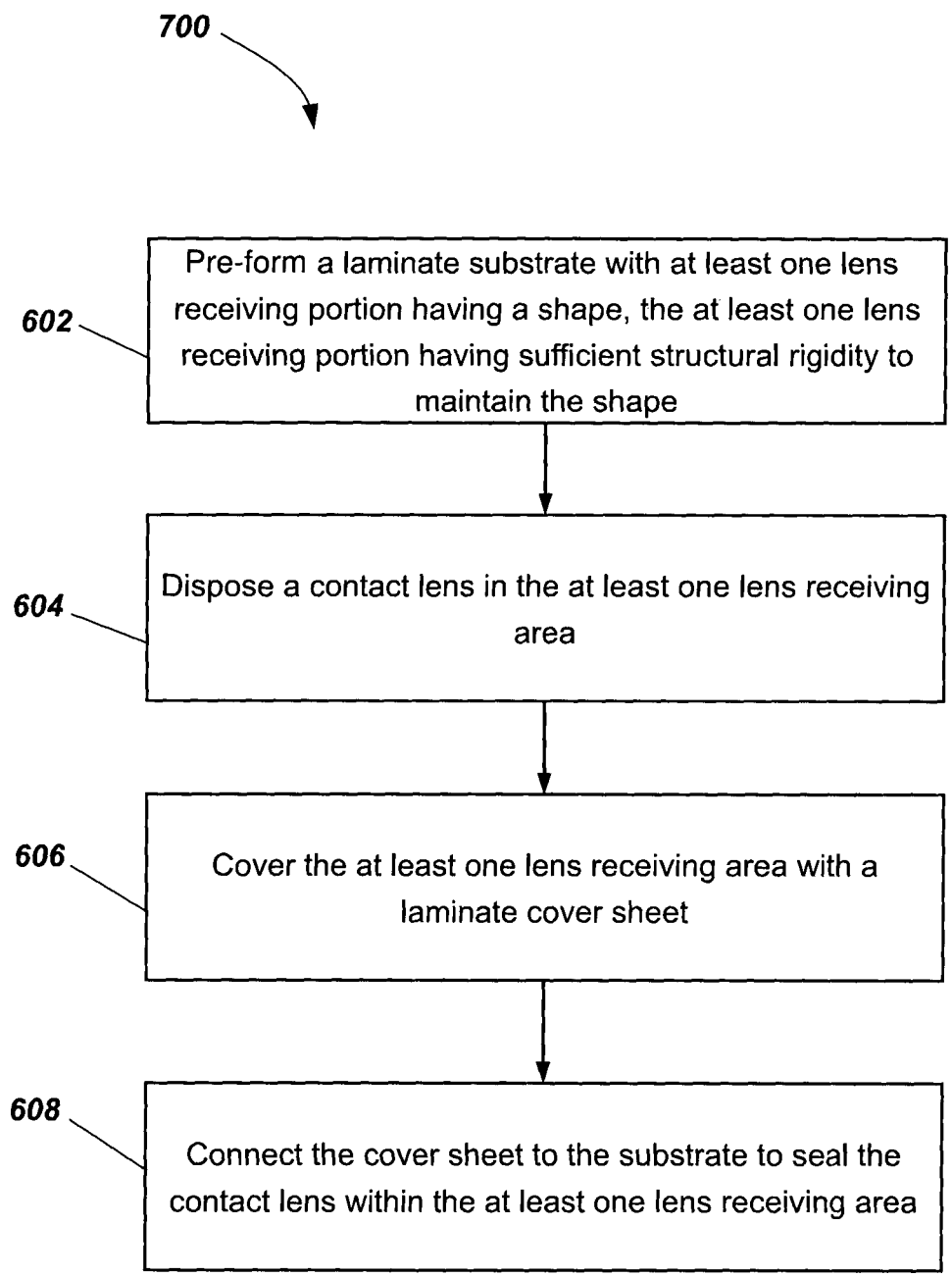
FIG. 25 is a flowchart showing steps of an example method of protecting a contact lens in a contact lens package according to principles of the present disclosure.

Referring now to FIG. 25, an example method (600) of packaging a contact lens is shown. The contact lens is housed in a contact lens package that includes a laminate substrate in a laminate cover sheet. In a step (602), the substrate is pre-formed with at least one lens receiving portion having a shape and sufficient structural rigidity to maintain the shape. In a step (604), the contact lens is disposed within the at least one contact lens receiving portion. In a step (606), the at least one lens receiving portion is covered with a cover sheet. In a step (608), the cover sheet is connected to the substrate to seal the contact lens within the at least one lens receiving portion.

Other steps related to such a method may include providing the substrate with a first polymer layer and a first metal layer, providing the cover sheet with a second polymer layer and a second metal layer, and connecting the cover sheet to the substrate includes heating, using pressure, ultrasonic welding, or otherwise bonding the first and second polymer layers together. Another example method step may include covering the at least one lens receiving area by arranging a polymer layer of the substrate facing and in contact with a polymer layer of the cover sheet. The method may include providing the substrate with a thickness at least five times the thickness of the cover sheet. The method may include providing each of the substrate and cover sheet with a light-reflective material.

Figure 26:
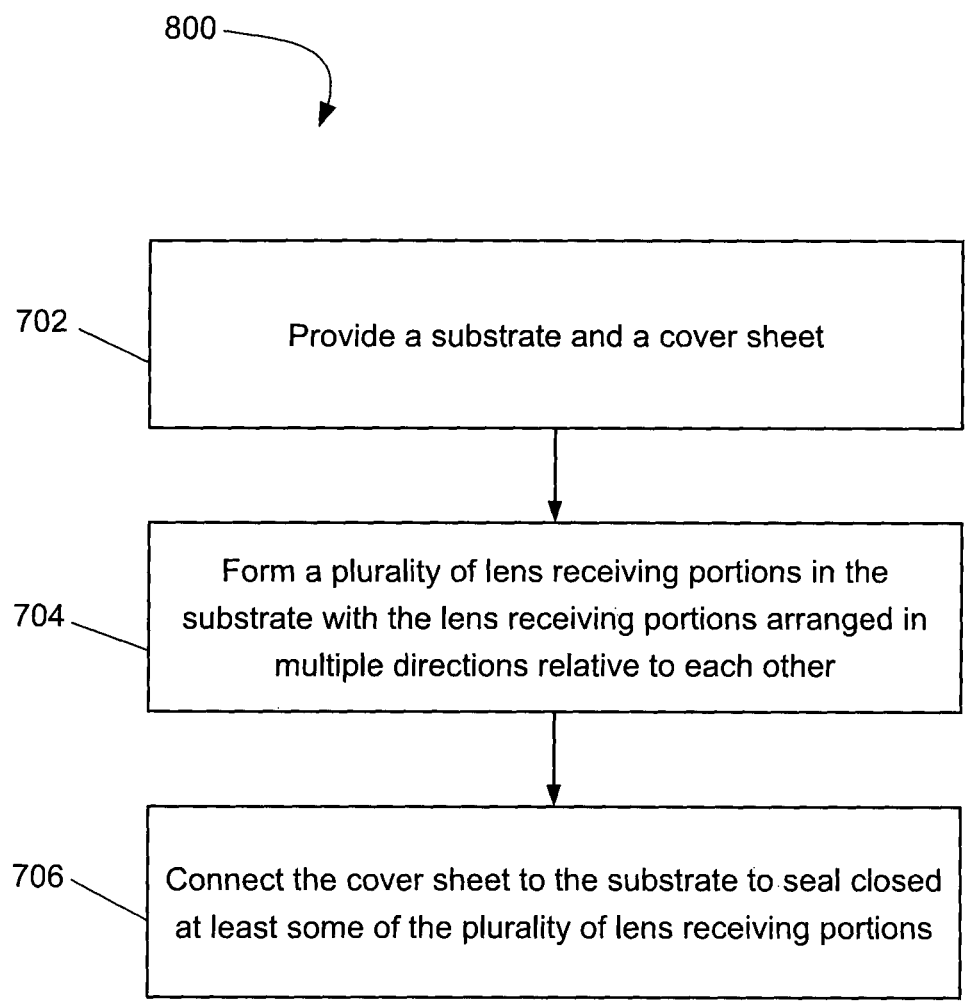
FIG. 26 is a flowchart showing steps of an example method of forming a contact lens package according to principles of the present disclosure.

Referring now to FIG. 26, another example method (700) in accordance with the present disclosure relates to forming a contact lens package. In a step (702), the method includes providing a substrate and a cover sheet. In a step (704), the method includes forming a plurality of lens receiving portions in the substrate with the lens receiving portions arranged in multiple directions relative to each other. In a step (706), the method includes connecting the cover sheet to the substrate to seal closed at least some of the plurality of lens receiving portions.

Other aspects of such a method may include forming the plurality of lens receiving portions by arranging the plurality of lens receiving portions in at least two rows. The method may also include providing the substrate as a laminate having at least a first polymer layer and a first metal layer, and providing the cover sheet with at least a second polymer layer and a second metal layer. Connecting the cover sheet to the substrate may include heating, using pressure, ultrasonic welding, or otherwise sealing the first and second polymer layers together. Forming a plurality of lens receiving areas may include forming each lens receiving area with a shape, and the substrate includes sufficient structural integrity to maintain the shape.

The method may include forming a perforation in the substrate between at least two of the plurality of lens receiving portions so that the substrate may be separable along the perforation at least before connecting the cover sheet to the substrate. Another aspect of the method may include forming at least one aperture in the substrate between at least some of the plurality of lens receiving portions, and covering the at least one aperture with the cover sheet before connecting the cover sheet to the substrate. The portion of the cover sheet covering the at least one aperture may operate as a tab to assist in removing the cover sheet from the substrate to gain access to the at least one lens receiving portion.

The simple structure of the package also allows the package to be assembled in few steps and for a low cost. The package may be assembled using flowline manufacturing such that the entire package is assembled in a single manufacturing line. In such a setup, the substrate may be manufactured and pre-formed with the depression, the contact lens and other materials may be disposed within the depression, the packaged may be sealed to the top surface of the substrate, and the package may be sterilized using one processing line, allowing for an efficient manufacturing process.

One method of use of the package is contemplated in which the top foil is peeled from the handle end back, exposing the lens. A finger presses against the lens, creating surface tension adhesion between the finger and the lens. The lens is then removed and placed in the eye. Alternatively, the package itself may be used as an insertion aid due to the flexible structure of the package.

Further details concerning the possible graphics and information conveyed by graphics, and methods of applying and displaying such graphics, are described in Singapore Patent Application filed on 18 Oct. 2011 and entitled "Sequential Artwork Design for Contact Lens Packaging", which patent application is incorporated herein in its entirety by this reference.

As disclosed in the above-mentioned Singapore Patent Application entitled "Sequential Artwork Design for Contact Lens Packaging", the graphic portions disclosure herein relate to graphics such as text and images that are visible on a contact lens package, a support structure used with a contact lens package, or a storage case or a storage sleeve configured to store at least one contact les package. The graphics included on a contact lens package may have several purposes. One purpose may be to convey information to a user related to the contents of the package. For example, the graphic may include text explaining properties of the contact lens such as a right or left eye contact lens, the prescription of the contact lens, the recommended duration of use of the contact lens, instructions for using the contact lens, and recommended care for the contact lens. Other information may relate to, for example, the manufacturer, brand, product name, etc. At least some of this information may be conveyed in multiple languages.

Some of the information conveyed may be communicated with non-text graphics such as, for example, colors, images, art, a location of the graphic on the contact lens package, the size, shape or orientation of the graphic, and other visual indicators separable from the meaning of the text itself. Some aspects of the present disclosure relate to the use of both text and non-text graphics on a contact lens package to convey different types of information. In one example, a non-text graphic (e.g., an image, pattern or color scheme) may be used on a contact lens package to convey information about the contact lens such as, for example, that the contact lens is a right eye contact lens without using text to convey that information. In other examples, both text and non-text graphics may be used to convey similar information, wherein redundancy in conveying information may help ensure the user understands that information. In other examples, a non-text image may include a certain pattern or type of image such as, for example, a flower petal pattern, a landscape pattern, a leaf pattern, an animal pattern, etc., wherein the non-text graphic conveys to the user that any package having that type of that pattern has a contact lens content of a certain type (e.g., a right or left eye contact lens).

Some of the example contact lens packages disclosed herein include multiple contact lens package portions that each include a receptacle (e.g., a contact lens receiving portion or boat) configured to retain a contact lens. The contact lens package portions may be separable from each other. When the contact lens package portions are connected, the graphic of the contact lens package may include a first portion that extends across all contact lens package portions, and a second portion that extends across only some of the contact lens package portions. Typically, those segments or portions of the graphic that are included on each individual contact lens package portion have meaning that is distinct and separate from the meaning of the graphics shown on each of the other contact lens package portions. For example, one of the graphic portions may include a plurality of words and each contact lens package portion includes at least one complete word in order to limit visual evidence of separation from the remaining contact lens package portions.

A portion of the graphic may span an entire width and/or entire length of a contact lens package that includes a plurality of contact lens package portions. Another portion of the graphic may span only some of the contact lens package portions. Another portion of the graphic may be isolated to a single one of the contact lens package portions. The graphic may be applied to a contact lens package at various locations such as, for example, along a bottom side of a substrate or along a top side of a cover sheet of the contact lens package.

The contact lens package may have different numbers of contact lens package portions. In one example, the contact lens package includes a three pack of contact lens package portions separable from each other along perforated lines defined in the contact lens package. Another example contact lens package includes multiple rows of contact lens package portions, wherein the rows are arranged side-by-side or opposite from each other. The graphic may span the multiple rows of contact lens package portions. In other arrangements, each row of contact lens package portions includes separate graphics with distinct features and/or meaning as compared to the graphics on another row of contact lens package portions.

The preceding description has been presented only to illustrate and describe exemplary embodiments of the system and process. It is not intended to be exhaustive or to limit the system and process to any precise form disclosed. Many modifications and variations are possible in light of the above teaching. It is intended that the scope of the system and process be defined by the following claims.

What is claimed is:

1. A contact lens package, comprising:
   a multi-layer laminate substrate having a first polymer layer, a first metal layer and at least one pre-formed lens receiving portion, in the form of a depression formed in the multi-layer laminate substrate sized to hold at least a portion of a contact lens and having sufficient structural rigidity to maintain the shape; and
   a cover sheet removably secured to the substrate and configured to seal a contact lens within the at least one pre-formed lens receiving portion;
   wherein the cover sheet comprises a laminate having a second metal layer and a second polymer layer; and
   wherein the cover sheet has greater flexibility than the multi-layer laminate substrate.

2. The contact lens package of claim 1, wherein the substrate has a substrate thickness and the cover sheet has a cover sheet thickness, and a ratio of the substrate thickness to the cover sheet thickness is in the range of about 5:1 to about 20:1.

3. The contact lens package of claim 1, wherein a thickness of the first polymer layer is at least 10 times thicker than a thickness of the second polymer layer.

4. The contact lens package of claim 1, wherein the substrate has a thickness in the range of about 150 micron to about 1,900 micron, and the cover sheet has a thickness in the range of about 50 to about 100 micron.

5. The contact lens package of claim 1, wherein the substrate comprises at least one material selected from the group consisting of polypropylene, polystyrene, polycarbonate, polyethylene, thermoplastic, plastic, and any combination thereof.

6. The contact lens package of claim 1, wherein the at least one pre-formed lens receiving portion has a depth less than a sagittal depth of the contact lens.

7. The contact lens package of claim 1, wherein the substrate and cover sheet each have a thickness sufficient to prevent substantial evaporation of fluids disposed within the at least one lens receiving portion.

8. The contact lens package of claim 6, further comprising a cap positioned at least partially covering the at least one lens receiving portion and captured between the substrate and the cover sheet.

9. The contact lens package of claim 1, wherein the substrate includes at least three pre-formed lens receiving portions arranged in multiple directions relative to each other.

10. The contact lens package of claim 9, wherein the substrate includes at least six pre-formed lens receiving portions, wherein a first three of the pre-formed lens receiving portions are arranged in series, and a second three of the pre-formed lens receiving portions are arranged in series and positioned opposite the first three of the pre-formed lens receiving portions.

11. The contact lens package of claim 1, wherein the cover sheet comprises a light-reflective material.

12. The contact lens package of claim 1, wherein the first polymer layer of the substrate is exposed within the at least one pre-formed lens receiving portions.

13. The contact lens package of claim 1, wherein the cover sheet includes a nylon layer exposed on a surface facing away from the at least one pre-formed lens receiving portion.

14. A contact lens package, comprising:
a multi-layer laminate substrate having a first polymer layer, a first metal layer and a plurality of pre-formed lens receiving portions, in the form of depressions formed in the multi-layer laminate substrate sized to hold at least a portion of a contact lens and having sufficient structural rigidity to maintain the shape, the plurality of pre-formed lens receiving portions being arranged in a plurality of rows; and
a cover sheet removably secured to the substrate and configured to seal a contact lens within each of the plurality of pre-formed lens receiving portions;
wherein the cover sheet comprises a laminate having a second metal layer and a second polymer layer;
wherein the cover sheet has a greater flexibility than the multi-layer laminate substrate.

15. The contact lens package of claim 14, wherein the substrate includes a reflective layer.

16. The contact lens package of claim 15, wherein the reflective layer comprises aluminum and is sealed to the substrate.

17. The contact lens package of claim 14, wherein the plurality of pre-formed lens receiving portions are arranged in two rows arranged opposite each other.

18. The contact lens package of claim 14, further comprising at least one pass through aperture extending through a polymer layer of the substrate, and the cover sheet extends over the at least one pass through aperture, wherein that portion of the cover sheet extending over the at least one pass through aperture provides a pull tab portion of the cover sheet to assist is removing the cover sheet from substrate to gain access to the plurality of pre-formed lens receiving portions.

19. The contact lens package of claim 14, further comprising a plurality of cap members each sized to cover one of the plurality of pre-formed lens receiving portions, the plurality of cap members being positioned between the substrate and the cover sheet.

20. The contact lens package of claim 19, wherein the plurality of cap members each include a plurality of apertures exposed to the pre-formed lens receiving portions.

21. The contact lens package of claim 19, wherein the substrate includes a top surface, the plurality of pre-formed lens receiving portions are accessible along the top surface, and the plurality of cap members are arranged flush mounted along the top surface.

22. A method for protecting a contact lens in a contact lens package, comprising:
providing a multi-layer laminate substrate and a laminate cover sheet;
pre-forming the multi-layer laminate substrate with at least one lens receiving portion, in the form of a depression formed in the multi-layer laminate substrate and having sufficient structural rigidity to maintain the shape;
disposing the contact lens in the at least one lens receiving portion;
covering the at least one lens receiving portion with the cover sheet;
connecting the cover sheet to the substrate to seal the contact lens within the at least one lens receiving portion;
wherein the substrate includes a first polymer layer and a first metal layer, and the cover sheet includes a second polymer layer and a second metal layer;
wherein connecting the cover sheet to the substrate includes heat bonding the first and second polymer layers together; and
wherein the cover sheet has a greater flexibility property than the multi-layer laminate substrate.

23. The method of claim 22, wherein covering the at least one lens receiving portion includes arranging the polymer layer of the substrate facing and in contact with a polymer layer of the cover sheet.

24. The method of claim 22, further comprising providing the substrate with a thickness at least 10 times a thickness of the cover sheet.

25. The method of claim 22, further comprising providing each of the substrate and cover sheet with a light-reflective material.

26. A method of forming a contact lens package, comprising:
providing a multi-layer laminate substrate and a laminate cover sheet;
pre-forming the multi-layer laminate substrate with a plurality of lens receiving portions, in the forms of depressions formed in the multi-layer laminate substrate, and having sufficient rigidity to maintain the shape
disposing a contact lens in each of the plurality of lens receiving portions;
connecting the laminate cover sheet to the substrate to seal each of the contact lenses within the corresponding ones of the plurality of lens receiving portions;
wherein the multi-layer substrate includes a first polymer layer and a first metal layer, and the laminate cover sheet includes a second polymer layer and a second metal layer;
wherein connecting the laminate cover sheet to the multi-layer laminate substrate includes heat bonding the first and second polymer layers together; and
wherein the laminate cover sheet has a greater flexibility property than the multi-layer laminate substrate.

27. The method of claim 26, wherein forming the plurality of lens receiving portions includes arranging the plurality of lens receiving portions in at least two rows.

28. The method of claim 26, further comprising forming a perforation in the substrate between at least two of the plurality of lens receiving portions, the substrate being separable along the perforation before connecting the cover sheet to the substrate.

29. The method of claim 26, further comprising forming at least one aperture in the substrate, the at least one aperture being arranged between at least some of the plurality of lens receiving portions, the method further comprising covering the at least one aperture with the cover sheet before connecting the cover sheet to the substrate, wherein a portion of the cover sheet covering the at least one aperture operates as a tab to assist in removing the cover sheet from the substrate to gain access to the at least one lens receiving portions.

\* \* \* \* \*